United States Patent [19]
Rohs

[11] 3,961,537
[45] June 8, 1976

[54] FEED DRIVE FOR THE BED SLIDE OF A MACHINE TOOL

[75] Inventor: Hans Günther Rohs, Rechberghausen, Germany

[73] Assignee: Gebruder Boehringer GmbH, Germany

[22] Filed: Nov. 12, 1974

[21] Appl. No.: 523,027

[30] Foreign Application Priority Data
Nov. 19, 1973   Germany............................ 2357659

[52] U.S. Cl. .................................................. 74/29
[51] Int. Cl.² ........................................ F16H 19/04
[58] Field of Search ................ 74/27, 29, 33, 89.17, 74/422, 424.6; 90/58 R

[56] References Cited
UNITED STATES PATENTS

| | | | |
|---|---|---|---|
| 1,198,727 | 9/1916 | Kaddeland | 74/27 |
| 2,187,759 | 1/1940 | Seybold | 74/27 |
| 2,779,198 | 1/1957 | Buttner | 74/27 |
| 2,922,363 | 1/1960 | Dudley | 74/27 X |
| 3,031,896 | 5/1962 | Walter | 74/424.6 X |
| 3,499,336 | 3/1970 | Bianchi | 74/422 X |
| 3,789,956 | 2/1974 | Neugebauer | 74/424.6 X |

*Primary Examiner*—Samuel Scott
*Assistant Examiner*—Frank H. McKenzie, Jr.
*Attorney, Agent, or Firm*—Shlesinger, Fitzsimmons & Shlesinger

[57] ABSTRACT

In a machine tool a bed-slide movable on a guide-way is driven by a motor mounted on the bed-slide and driving a pair of pinions journalled on the bed-slide and engaging racks provided on the bed of the machine tool in a stationary relationship thereto. Imbalance of the torques driving the pinions might interfere with proper guidance of the bed-slide on the bed. Therefore, the driving torques are perfectly balanced by the provision of a differential transmission connecting the motor to the pinions. Preferably, the differential transmission includes a shaft mounted on the bed-slide for axial displacement and a pair of helical gears of opposite hand fixed to said shaft, each helical gear driving one of said pinions.

4 Claims, 2 Drawing Figures

3,961,537

FEED DRIVE FOR THE BED SLIDE OF A MACHINE TOOL

BACKGROUND AND BRIEF DESCRIPTION OF INVENTION

The invention relates to a machine tool in which a bed-slide movable on a guide-way provided on the bed is fed by a motor. A pair of racks is mounted in fixed relationship to the bed-slide on either side of the guide-way. Pinions meshing with the racks are journalled on the bed-slide and are connected with the feed motor by a transmission. An example of such a machine tool is a boring machine in which the bed-slide carries a horizontal boring tool fixed thereto to be fed into a rotary workpiece carried by a rotary spindle journalled in a spindle housing mounted on the bed.

The provision of a pair of racks results in a symmetrical structure of the bed-slide with respect to the vertical longitudinal central plane, in contrast to such types of machine tools in which a single rack is fixed to the bed-slide laterally. The symmetry of the structure with respect to said longitudinal plane will avoid any interference with the feed motion of the bed-slide of oblique forces liable to produce undesired clamping effects where the driving force is introduced into the bed-slide in a non-symmetrical manner. Such non-symmetrical exertion of the driving force, however, may also occur in spite of the provision of a pair of racks, where the pinions meshing with the racks are driven with different driving torques owing to inaccuracies of the transmission connecting the feed motor with the pinions.

It is the object of the present invention to avoid such imbalance of the driving torques exerted on the pinions and to insure an equal distribution of the feeding force on both racks.

This object is attained according to the present invention by the provision of a differential transmission having an input connected with the feed motor and two outputs, each output being connected with one of the pinions.

While this differential transmission could be designed in a manner similar to that of a motor vehicle connecting the driving motor with the driven wheels of the vehicle, it is another object of the invention to simplify the differential transmission considerably compared with the conventional differential transmissions of motor vehicles. This object is attained, according to another aspect of the invention, by such a design of the feeding mechanism that a pair of gear sets each acting on one of the racks have a common input shaft driven by the motor and helical gears of opposite hand fixed to said shaft for common displacement therewith. Any tendency of this transmission to imbalance the driving torques exerted on the two sets of gears results in an axial displacement of the shaft and in a consequent relative actuation of the two sets of gears in the opposite sense of rotation to thereby balance the driving torques.

Where the invention is applied to a machine tool in which the bed-slide is movable on top of the bed, the pinions engaging the racks and driven by the differential transmission are preferably mounted below the racks. This will prevent the bed-slide from being lifted from the bed as might occur where the bed-slide is fed by a considerable force contrary to a counter-force acting on the bed-slide above the bed. These and other features of the present invention will be discussed in greater detail below with reference to the drawings accompanying this specification.

BRIEF DESCRIPTION OF DRAWINGS

In FIG. 2 the bed-slide 16 and the bed 60 are diagrammatically shown in a sectional view. A central flange 62 forms part of the bed-slide on the bottom thereof. Coaxial bearings are provided in this flange and in the vertical side walls 64 and 164 of the bed-slide and accommodate a horizontal shaft 66 extending transversely across the bed 60. The end sections of that shaft outside the walls 64, 164 carry helical gears 68 and 70 fixed thereon. The shaft 66 is axially movably mounted in such bearings. Each of the helical gears 68, 70 meshes with a helical gear 72, or 74 respectively, which is fixed to a shaft 76, or 176 respectively. Each of these shafts extends parallel to the shaft 66 and is journalled by bearings 80 in the walls 64 and 164 and in additional vertical walls 78 and 178 of the bed slide. Moreover, each of the shafts 76 and 176 extends through the walls 64, and 164 respectively, and its end is formed as a pinion 82, or 182 respectively, meshing with a rack 84, or 184 respectively, fixed to the bed 60 and mounted on the bottom of the guideway forming part of the bed 60 and carrying the bed-slide 16.

Feeding means to be described hereinafter are capable of driving shaft 66 thus imparting rotation to the pinions 82 and 182 which engage the racks 84 and 184 for motion lengthwise thereof.

Figure 1:
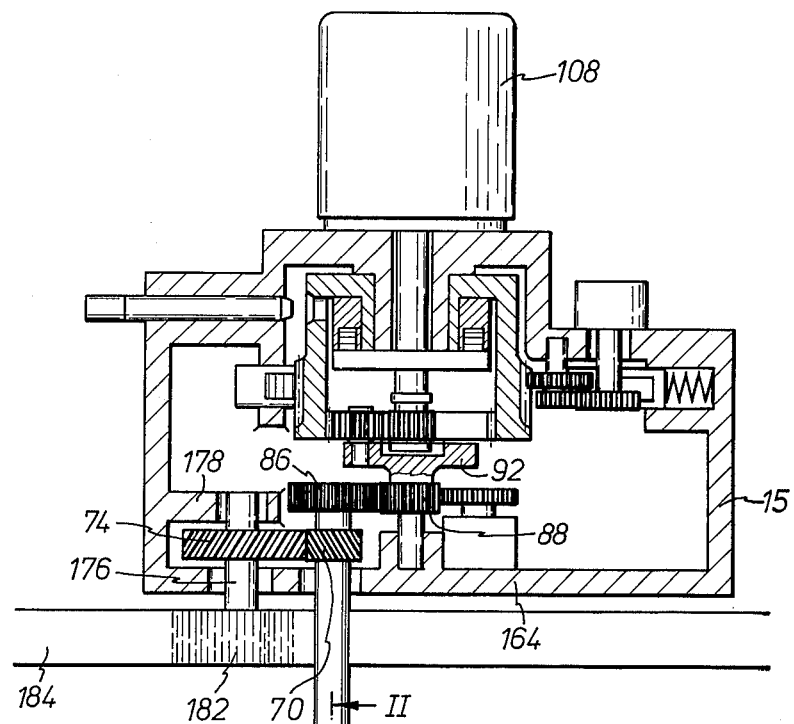
FIG. 1 is a top view of the pair of racks and of the feed drive, the bed-slide being omitted and the housings of the two sets of gears being shown in section.
Figure 1:
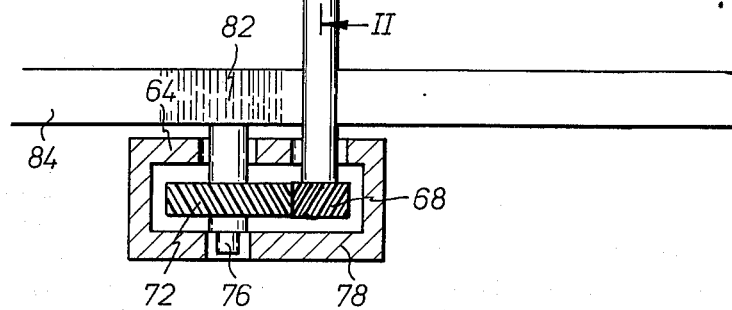
Figure 2:
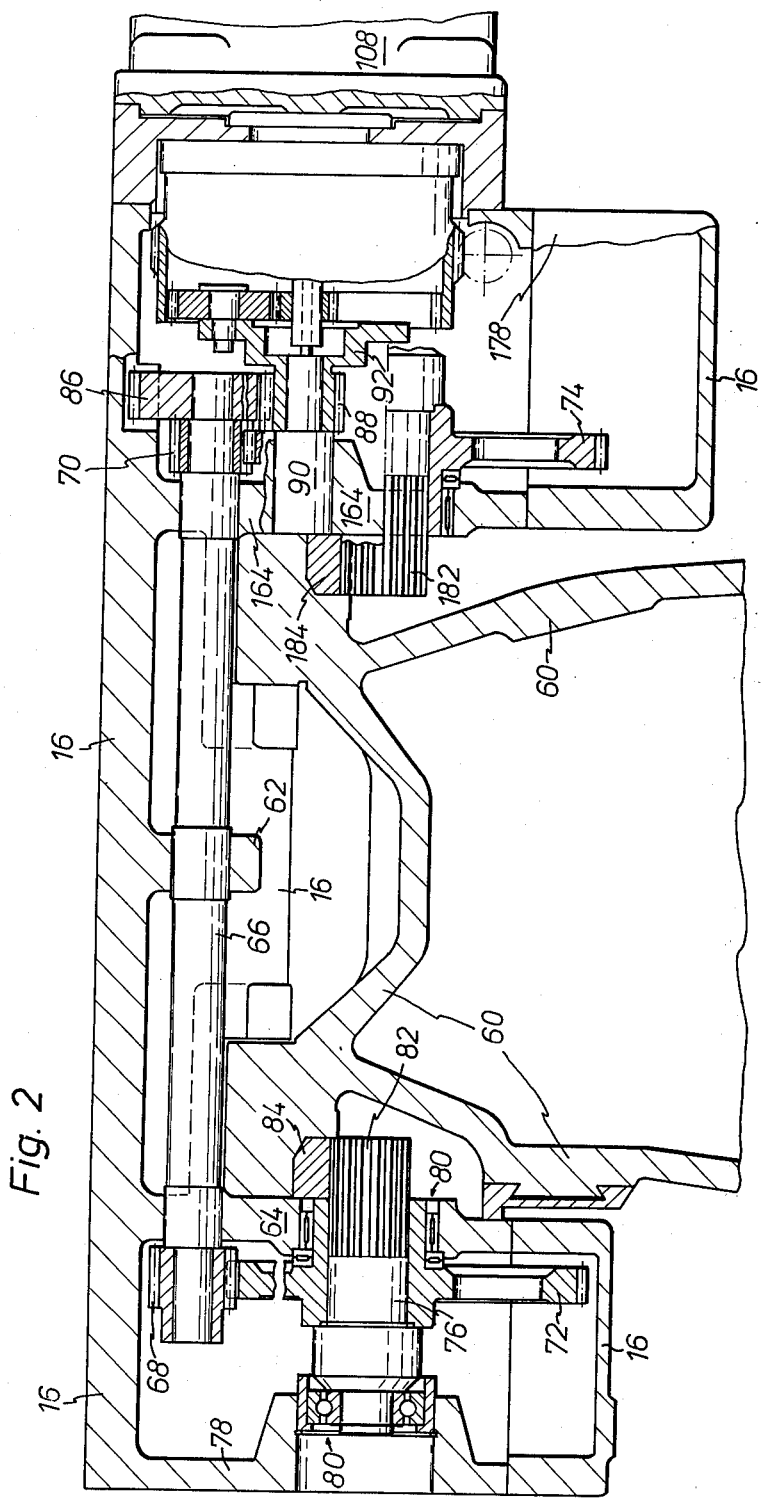
FIG. 2 is a sectional view of the bed of a boring machine, of the bed-slide and of the feeding transmission, the vertical section being taken substantially along the line II—II of FIG. 1.

The righthand end section of shaft 66 shown in FIG. 2 extends through the helical gear 70 and at its end carries a spur gear 86 fixed thereto and engaged by a pinion 88. This pinion is rotatably mounted on a pin 90 fixed in a horizontal bore provided in the wall 164 of the bed-slide in parallel relationship to shaft 66. The pinion 88 is integral with a flange 92 which is drivingly connected with an electric motor 108 by means which need not be described as they do not form part of the invention. The housing of the electromotor 108 is provided with a flange bolted to the outside of the bedslide 16 in coaxial relationship to the pin 90.

If all of the pinions and gears referred to hereinabove were provided with teeth extending parallel to their axes and held against axial displacement, minor inaccuracies in the assembly or the dimensions would result in an uneven distribution of the driving force upon the racks 84 and 184 thus resulting in an imbalance of the driving forces exerted by the shaft 66 on the bearings in the walls 64 and 164. It is desirable, however, that the pinions 82 and 182 will always exert equal driving forces on the racks 84, 184. It is the object of the invention to obtain such perfect balance of the driving forces acting on both flanges 64 and 164 of the bed-slide 16. This object is attained in the instant case by using pinions 68 and 70 of opposite hand. Moreover, the shaft 66 is mounted for axial displacement in the coaxial bearings carried by the sidewalls 64 and 164.

Since the helical teeth of gears 68 and 70 are of opposite hand, the axial forces exerted by such teeth on shaft 66 will balance each other as long as these gears 68 and 70 exert equal driving torques on the gears 72 and 74 and on the pinions 82 and 182 fixed thereto. Should it happen owing to any inaccuracies of the assembly or of the dimensions of the various elements, however, that these driving torques tend to differ from each other, the axial components of the forces of engagement acting on shaft 66 will no longer balance each other but will displace the shaft 66 axially and will thus increase the driving torque exerted by one of the helical pinions 68, 70 decreasing the driving force exerted by the other one of the pinions accordingly, until the axial components will balance each other again. When such balance is reached, the helical gears 68 and 70 will exert equal driving torques on the gears 72 and 74 and on the pinions 82 and 182 connected therewith.

From the above it will be appreciated that the helical teeth of opposite hand of the gears 68 and 70 in cooperation with their common axially movable shaft 66 constitute a differential transmission having an input connected with the motor 108 and two outputs each output being connected with one of the pinions 82 and 182. This differential transmission will superimpose an additional rotation on the rotation of gears 72 and 74 produced by motor 108 and shaft 66, said additional rotation being produced by the axial displacement of the shaft 66 in a positive or negative sense.

In principle this is the same differential effect attained in a motor vehicle by the differential transmission connecting the pair of driven wheels with the common motor, except that in the instant case the angular range of the superimposed rotations is substantially smaller. For very small opposite rotations of the gears 72 and 74 caused by axial displacement of shaft 66 will suffice to balance the driving forces acting on the racks 84 and 184.

While the bed-slide 16 is mounted on top of the bed 60, the racks 84 and 184 are mounted on the bottom of the guide-way formed by the bed and, therefore, the pinions 82 and 182 are located below the racks and will thus prevent any lifting of the bed-slide 16 from the guide-way as otherwise might occur where the bed-slide is fed with a high force against a counterforce acting on the bed-slide at some distance above the bed.

The embodiment described hereinabove is capable of many modifications within the scope of the appended claims. Thus, the racks 84, 184 could be provided with inclined teeth of opposite inclination. The pinions 82, 182 would be provided with helical teeth capable of meshing with the inclined teeth of the racks and the shafts 76, 176 would be mounted for axial displacement and would be connected for common displacement by suitable means, e.g. a bridge member connecting their bearings 80 for common displacement.

While a preferred embodiment of the invention has been described hereinabove, it is to be understood that the scope of this invention is in no way restricted to the details of such embodiment but is capable of numerous modifications within the scope of the appended claims.

What I claim is:

1. In a machine tool a bed provided with a straight guideway, a bed-slide movable thereon, a pair of spaced, parallel racks provided on said guide-way in fixed relationship thereto, a pair of spaced pinions each engaging one of said racks and being rotatably mounted on said bed-slide, a feed motor on said bed-slide, and means for gearing said pinions to said motor, including
a differential transmission having an input connected with said motor and having two outputs,
said outputs comprising a first pair of helical gears drivingly connected with said pinions, each of said helical gears having a hand opposite to that of the other helical gear of the pair thereof, and
means mounting said first pair of helical gears so that they equalize the torques transmitted thereby from said motor to said pinions by affording relative rotation of said pinions.
2. The combination claimed in claim 1 in which
said mounting means comprises a shaft connecting said helical gears and mounted on said slide for axial displacement, and
said differential transmission further comprising means for drivingly connecting said motor with said shaft, and
each of said first pair of helical gears being fixed to said shaft for axial displacement therewith.
3. The combination claimed in claim 2, including
a second pair of helical gears interposed between said first pair and said pinions, each of said second pair of helical gears being coaxially fixed to one of said pinions and meshing with one of said first pair of helical gears,
the second pair of helical gears being of opposite hand, and
said means for drivingly connecting said motor with said shaft comprising a pair of spur gears.
4. In a machine tool,
a bed provided with a horizontal guide-way,
a bed-slide mounted on top of said guide-way,
a pair of spaced racks mounted on the bottom of said guide-way in fixed relationship thereto,
a horizontal shaft journalled in said bed-slide for rotation about an axis extending transversely to said guide-way, and for axial displacement,
a first pair of spaced helical gears of opposite hand fixed to said shaft adjacent opposite ends thereof, respectively,
a second pair of spaced helical spur gears journalled on said bed-slide and meshing with said first pair of helical gears,
a pair of spaced pinions journalled on said bed-slide, each meshing with one of said racks and coaxially fixed to one of said second pair of helical spur gears,
a motor mounted on said bed-slide, and means including a pair of spur gears for drivingly connecting said motor to said shaft.

* * * * *